(12) United States Patent
Choi et al.

(10) Patent No.: US 9,516,372 B2
(45) Date of Patent: Dec. 6, 2016

(54) MULTIMEDIA I/O SYSTEM ARCHITECTURE FOR ADVANCED DIGITAL TELEVISION

(75) Inventors: Hoon Choi, Mountain View, CA (US);
Daekyeung Kim, Palo Alto, CA (US);
Ju Hwan Yi, Sunnyvale, CA (US);
Wooseung Yang, Cupertino, CA (US);
Young Il Kim, Sunnyvale, CA (US);
Alex Chervet, Pleasanton, CA (US);
Timothy Vehling, San Jose, CA (US)

(73) Assignee: Lattice Semiconductor Corporation, Portland, OR (US)

( * ) Notice: Subject to any disclaimer, the term of this patent is extended or adjusted under 35 U.S.C. 154(b) by 94 days.

(21) Appl. No.: 13/302,452

(22) Filed: Nov. 22, 2011

(65) Prior Publication Data

US 2012/0147271 A1 Jun. 14, 2012

Related U.S. Application Data

(60) Provisional application No. 61/422,063, filed on Dec. 10, 2010.

(51) Int. Cl.
*G06F 13/36* (2006.01)
*H04N 21/426* (2011.01)
(Continued)

(52) U.S. Cl.
CPC ........ *H04N 21/42607* (2013.01); *H04N 5/765* (2013.01); *H04N 21/4316* (2013.01);
(Continued)

(58) Field of Classification Search
CPC ............ H04N 21/4347; H04N 21/4316; H04N 21/42607; H04N 21/43635; H04N 21/43632
(Continued)

(56) References Cited

U.S. PATENT DOCUMENTS 6,558,049 B1 5/2003 Shin
6,718,422 B1 4/2004 Kelley et al.
(Continued)

FOREIGN PATENT DOCUMENTS

CN 101379817 A 3/2009
CN 101601291 A 12/2009
(Continued)

OTHER PUBLICATIONS

International Search Report and Written Opinion, International Application No. PCT/US2011/062434, mailed Apr. 19, 2012, 7 pages.
(Continued)

*Primary Examiner* — Idriss N Alrobaye
*Assistant Examiner* — Brooke Taylor
(74) *Attorney, Agent, or Firm* — Fenwick & West LLP (57) ABSTRACT

Embodiments of the invention are generally directed to a multimedia I/O system architecture for advanced digital television. An embodiment of a multimedia system includes an I/O (input/output) control chip, the I/O control chip including one or more audio/video sub-processing engines for the processing of one or more data streams; a processing core chip for the processing of data, including audio/video data received from the I/O control chip; and one or more shared I/O channels for the transfer of data between the I/O control chip and the processing core chip.

20 Claims, 5 Drawing Sheets

(51) Int. Cl.
  *H04N 5/765* (2006.01)
  *H04N 21/4363* (2011.01)
  *H04N 21/431* (2011.01)
  *H04N 21/434* (2011.01)

(52) U.S. Cl.
  CPC ... *H04N 21/4347* (2013.01); *H04N 21/43632* (2013.01); *H04N 21/43635* (2013.01)

(58) Field of Classification Search
  USPC .......................................................... 710/315
  See application file for complete search history.

(56) References Cited

U.S. PATENT DOCUMENTS

| | | | |
|---|---|---|---|
| 8,560,753 B1* | 10/2013 | Hobbs et al. | 710/306 |
| 8,925,010 B2 | 12/2014 | Ho et al. | |
| 2006/0158568 A1 | 7/2006 | Kaylani et al. | |
| 2006/0215060 A1 | 9/2006 | Dai et al. | |
| 2006/0282785 A1 | 12/2006 | McCarthy et al. | |
| 2007/0142022 A1 | 6/2007 | Madonna et al. | |
| 2008/0007616 A1* | 1/2008 | Baladhandayuthapani | 348/14.12 |
| 2008/0062319 A1* | 3/2008 | Hsieh et al. | 348/565 |
| 2008/0244641 A1 | 10/2008 | Ho et al. | |
| 2009/0116583 A1* | 5/2009 | Lida et al. | 375/296 |
| 2010/0026790 A1* | 2/2010 | Ohba et al. | 348/51 |
| 2010/0201877 A1 | 8/2010 | Yoo | |
| 2010/0208142 A1* | 8/2010 | He | 348/671 |
| 2010/0231795 A1* | 9/2010 | Choi | 348/572 |
| 2010/0306798 A1 | 12/2010 | Ahn et al. | |
| 2011/0268425 A1* | 11/2011 | Glen | H04N 5/63 386/272 |
| 2011/0310301 A1* | 12/2011 | Kim et al. | 348/567 |

FOREIGN PATENT DOCUMENTS

| | | |
|---|---|---|
| CN | 101841682 A | 9/2010 |
| JP | 2006-019997 A | 1/2006 |
| JP | 2006-318281 A | 11/2006 |
| JP | 2009-512896 A | 3/2009 |
| JP | 2010-502115 A | 1/2010 |
| KR | 10-2010-0058334 | 6/2010 |
| TW | 552512 B | 9/2003 |
| TW | 200531527 A | 9/2005 |
| TW | I243593 B | 9/2005 |
| TW | 200635357 A | 10/2006 |
| WO | WO 01/65831 A2 | 9/2001 |
| WO | WO 2008/057730 A2 | 5/2008 |
| WO | WO 2009/029338 A1 | 3/2009 |

OTHER PUBLICATIONS

European Extended Search Report, European Application No. 11846813.1, Apr. 10, 2014, 5 pages.
European Examination Report, European Application No. 11846813.1, Mar. 4, 2015, 4 pages.
Japanese Office Action, Japanese Application No. 2013-543209, Jun. 2, 2015, 5 pages (with English summary).
Taiwan Office Action, Taiwan Application No. 100144722, Oct. 27, 2015, 17 pages (with concise explanation of relevance).
Chinese First Office Action, Chinese Application No. 201180059163.1, Jan. 26, 2016, 9 pages (with concise explanation of relevance), 9 pages.
Taiwan Office Action, Taiwan Application No. 100144722, Mar. 21, 2016, 27 pages (with concise explanation of relevance).
Taiwan Office Action, Taiwan Application No. 100144722, Jul. 12, 2016, 19 pages (with concise explanation of relevance).
Chinese Second Office Action, Chinese Application No. 201180059163.1, Aug. 24, 2016, 6 pages.
European Examination Report, European Application No. 11846813.1, Jul. 20, 2016, 7 pages.

* cited by examiner

MULTIMEDIA I/O SYSTEM ARCHITECTURE FOR ADVANCED DIGITAL TELEVISION

RELATED APPLICATIONS

This application is related to and claims priority to U.S. Provisional Patent Application No. 61/422,063, filed Dec. 10, 2010, and such application is incorporated herein by reference.

TECHNICAL FIELD

Embodiments of the invention generally relate to the field of electronic devices and, more particularly, to a multimedia I/O system architecture for advanced digital television.

BACKGROUND

Advanced television systems are increasingly required to process large amounts of data in multiple video and audio streams incoming from various types of I/O interfaces, including interfaces such as Ethernet, USB™ (Universal Serial Bus), HDMI™ (High-Definition Multimedia Interface), DVI™ (Digital Visual Interface), and legacy analog ports.

This high computing power requirement for televisions has driven manufacturers of audio/video processing cores to, for example, manufacture such devices using deep submicron processes to integrate more logic within a given die size. As the complexity of the processing core increases, deeper sub-micron process may be needed.

However, each time a target manufacturing process is changed, process migration work is also required for the existing I/O interface circuits that are contained within a processing core. This manufacturing process incurs high engineering costs not only for layout redrawing but also for time-consuming validation processes for the devices.

To avoid process migration of I/O interface circuits as deeper processes are sought, television manufacturers may instead utilize off-chip I/O interface solutions, utilizing discrete I/O chips, rather than integrating the I/O interface blocks within a single processing core chip.

BRIEF DESCRIPTION OF THE DRAWINGS

Embodiments of the invention are illustrated by way of example, and not by way of limitation, in the figures of the accompanying drawings in which like reference numerals refer to similar elements.

SUMMARY

Embodiments of the invention are generally directed to a multimedia I/O system architecture for advanced digital television.

In a first aspect of the invention, an embodiment of a multimedia system includes an I/O (input/output) control chip, the I/O control chip including one or more audio/video sub-processing engines for the processing of one or more data streams; a processing core chip for the processing of data, including audio/video data received from the I/O control chip; and one or more shared I/O channels for the transfer of data between the I/O control chip and the processing core chip.

DETAILED DESCRIPTION

Embodiments of the invention are generally directed to a multimedia I/O system architecture for advanced digital television.

In a conventional I/O system architecture of an advanced digital television system, discrete I/O chips are connected to a processing core chip in parallel to support various I/O ports. This architecture is straightforward, but creates high manufacturing costs for the processing core chip because of increasing pin count that is required for connecting all the I/O chips in pin-to-pin manner.

In some embodiments, an apparatus or system includes an I/O controller chip coupled with a processing core chip, the chips communicating via a one or more shared I/O channels. In some embodiments, I/O interfaces for the system are integrated within the single I/O controller chip. In some embodiments, the I/O controller chip operates to reduce certain data traffic in the transfer of multiple data streams to reduce the data traffic between the I/O controller chip and the processing core chip.

Figure 1:
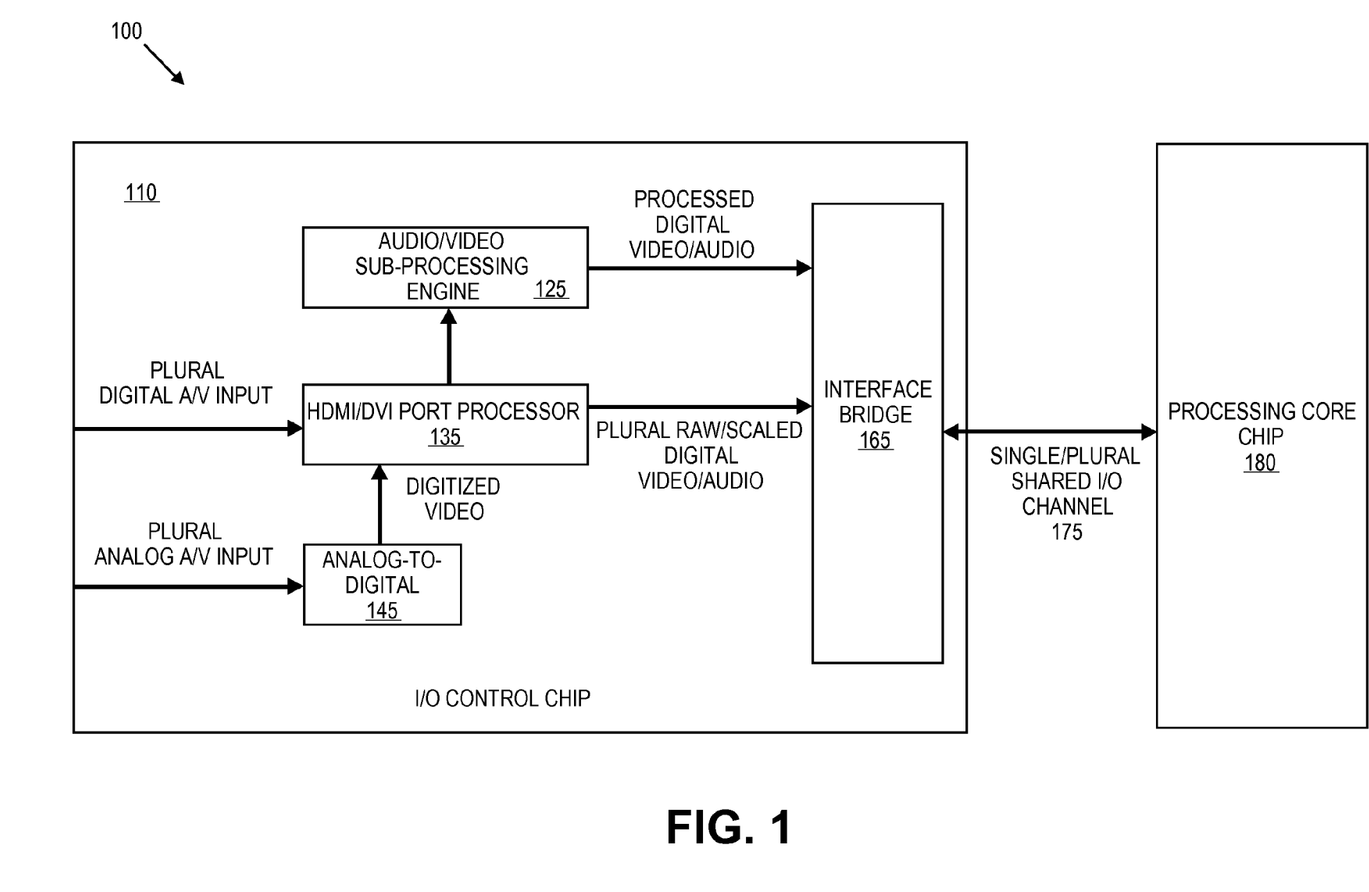
FIG. 1 illustrates an embodiment of an I/O system architecture of an advanced digital television system.

FIG. 1 illustrates an embodiment of an I/O system architecture of an advanced digital television system. In some embodiments, a system architecture 100 includes two chipsets: a processing core chip 180 and an I/O controller chip 110. In some embodiments, the two chips communicate with each other through a high-performance shared I/O channel or channels 175.

In some embodiments, all I/O interface circuits are integrated within the single I/O controller chip 110. The I/O interface blocks are internally connected to an on-chip bus system and share the available bandwidth. In some embodiments, the I/O control chip 110 may include a multiple-input HDMI/DVI port processor 135, an analog-to-digital converter 145, an Ethernet interface and a USB hub (which are not illustrated), a audio/video sub-processing engine 125, an interface bridge 165, and other components.

In some embodiments, the interface bridge 165 transfers bus transactions to/from the processing core chip 180 through the off-chip shared I/O channels 175. The shared I/O channels 175 may be standard interface or proprietary interface channels, and may be a single interface or composed of multiple interfaces, including multiple heterogeneous interfaces. In certain circumstances, the illustrated architecture 100 in FIG. 1 may generate a communication bottleneck with regard to multiple data streams. In some embodiments, in order to address the problem, sufficient performance may be provided in the I/O control chip to accommodate all the interface bandwidth.

In some embodiments, the shared communication of the system architecture 100 may be utilized to reduce manufacturing cost by minimizing pin count while supporting various I/O interfaces. In some embodiments, the audio/video sub-processing engines 125 may be integrated in the I/O control chip 110. The integration of such sub-processing engines 125 may reduce the amount of communication data required to be transferred over the shared I/O channels 175 by data compression and resizing before such data is transferred to the processing engine. Further, the inclusion of such sub-processing engines 125 operates to offload the processing core 180 by distributing computing loads to the I/O control chip 110.

Figure 2:
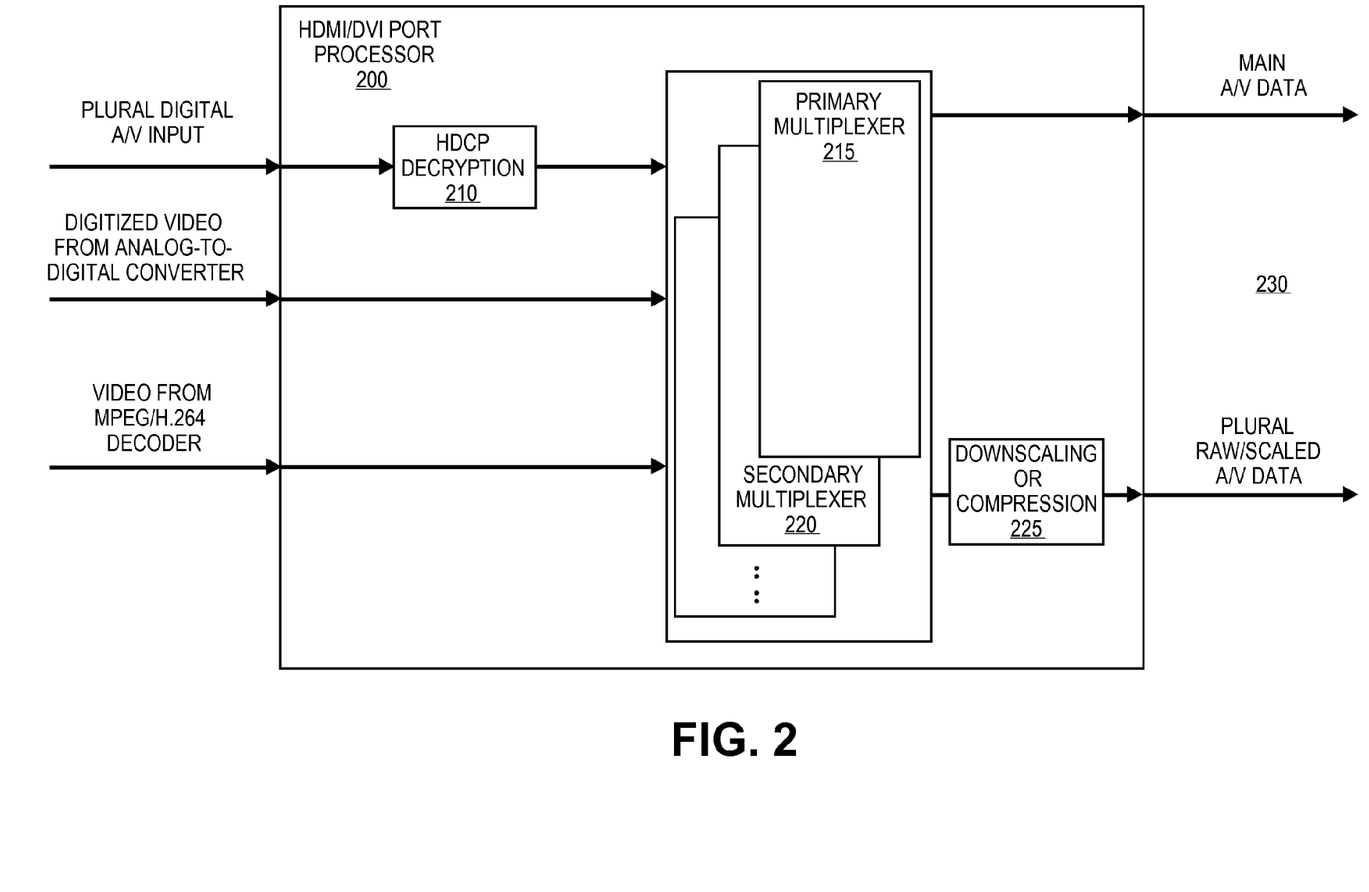
FIG. 2 is an illustration of an embodiment of a port processor.

FIG. 2 is an illustration of an embodiment of a port processor. As shown in FIG. 2, a port processor 200, such as an HDMI/DVI port processor, includes data decryption 210, such as for decrypting data encrypted by HDCP (High-bandwidth Digital Content Protection), multiplexing multiple high definition audio/video streams, using, for example, the illustrated primary multiplexer 215 and secondary multiplexer 220, and downscaling or compression 225, to generate one or more audio/video data streams 230. In some embodiments, an analog-to-digital converter, such as converter 145 provided in FIG. 1, converts legacy analog audio/video input data streams into parallel digital data packets, and an audio/video sub-processing engine, such as sub-processing engine 125 provided in FIG. 1, offloads computing burdens from the processing core chip (processing core chip 180 in FIG. 1) by processing the audio/video stream before sending the data over the shared I/O channels.

In some embodiments, each of the blocks (such as the audio/video sub-processing engine, HDMI/DVI port processor, analog to digital converter, Ethernet interface, and USB hub) is connected to the interface bridge (bridge 165 in FIG. 1). In some embodiments, the main processor in the processing core chip 180 may control each of the blocks in the I/O control chip as a memory mapped 10 or through other methods. In some embodiments, when using a memory mapped 10 method, each of the blocks that reside behind an interface bridge (bridge 165 in FIG. 1) is assigned a mutually-exclusive address range. In some embodiments, the processing core chip can control and access each I/O block using memory read/write operations. In some embodiments, for time-critical data streaming I/O, DMA (Direct Memory Access) transfers data streams with minimum intervention by the main processor.

Figure 3A:
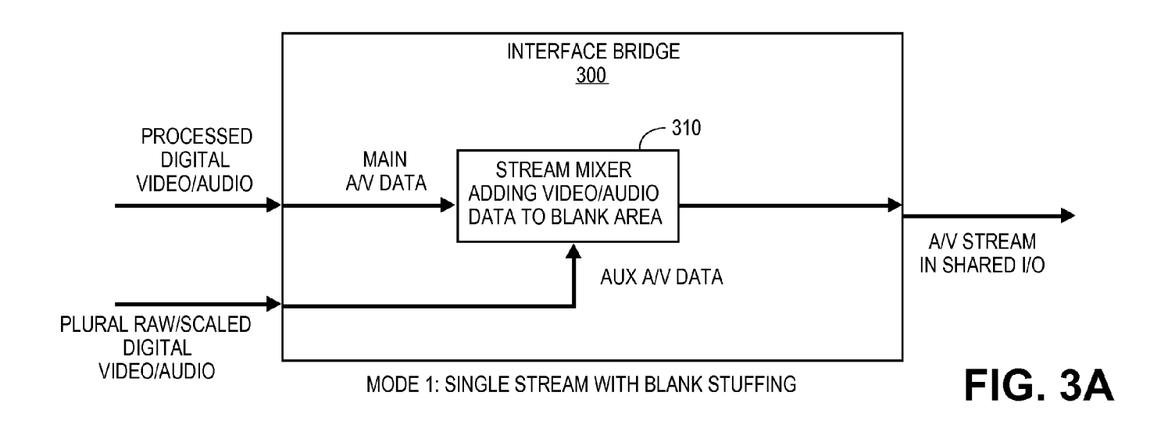
FIG. 3 illustrates certain embodiments of an interface bridge.
Figure 3B:
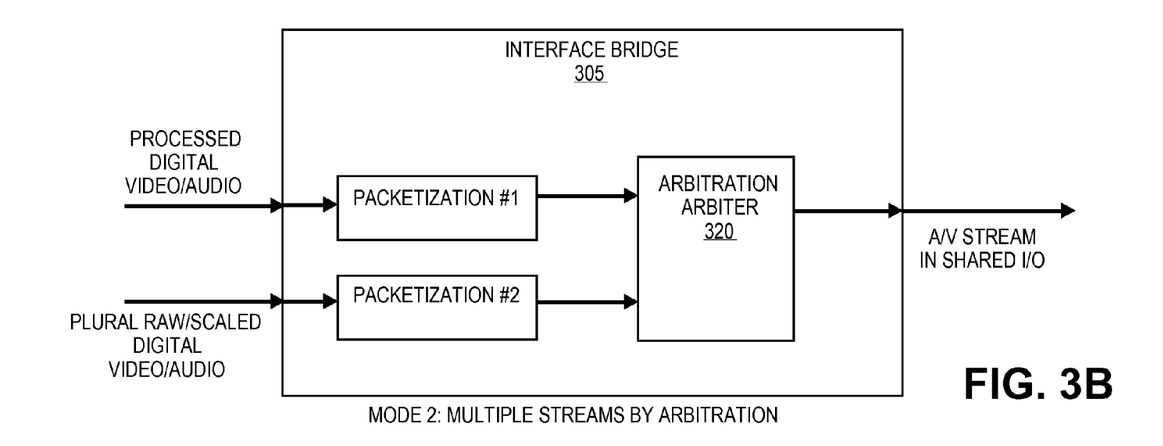

FIG. 3 illustrates certain embodiments of an interface bridge. In some embodiments, an interface bridge 300 or 305 (which may be the bridge 165 provided in FIG. 1) receives resulting streams from internal interface blocks as inputs. In some embodiments, after processing of the received data is completed, the interface bridge 300-305 sends the results to the processing core chip (chip 180 in FIG. 1) through the one or more shared I/O channels (channels 175 in FIG. 1).

In some embodiments, when transmitting multiple audio/video streams simultaneously, there are two modes: A first mode (Mode1) shown with regard to interface bridge 300 having a single stream with blank stuffing, and a second mode (Mode2) shown with regard to interface bridge 305 having multiple streams handled by arbitration.

In some embodiments, in the first mode of single stream blank stuffing, one main audio/video stream may be transmitted using the interface bridge 300. In order to transfer other sub-streams simultaneously with the main stream via stream mixer 310, blank areas of the main stream are stuffed with other sub-stream data.

In some embodiments, in the second mode having multiple streams by arbitration for an interface bridge 305, wherein each of the input streams acquires a grant from an arbiter 320 before starting its transaction.

In some embodiments, each mode is based on a time-sharing mechanism to share the bandwidth of the shared I/O channels. Due to the limited bandwidth of the one or more shared I/O channels, data size of some transmitted audio/video streams may be limited. In some embodiments, the port processor and audio/video sub-processing engine are operable to perform one or more of downscaling, compression, frame-rate control, and other functions to reduce the amount of transferred data.

However, embodiments are not limited to any particular architecture, and may utilize one of several usage models for connecting I/O interface and offloading processing load of the processing core chip.

In a first usage case, in an I/O architecture, such as the I/O architecture illustrated in FIG. 1, multiple audio/video streams, such as HDMI/DVI streams and analog audio/video streams, are converted to digital parallel format by a HDMI/DVI port processor and analog-to-digital converter, respectively. In some embodiments, the streams are transferred as series of data packets to the processing core chip though the shared I/O channels. In some embodiments, the processing core chip then temporarily stores the steam in an internal memory and processes the stream to generate a final audio/video stream. In this usage case, the I/O control chip may operate mainly to deliver data streams over the shared I/O channel or channels while most of the audio/video manipulation may be performed by the processing core chip.

In a second usage case, transferring multiple high-definition audio/video data streams simultaneously may require too much bandwidth to allow for delivering all of the data streams over the same shared I/O channel or channels. In some embodiments, one or more of the data streams may be delivered in a reduced format while one or more of the others of the data streams are delivered in their a native format. In some embodiments, the port processor and an audio/video sub-processing engine may perform down-scaling, frame-rate controlling, compressing, or other functions to generate lower data rate streams or snapshots before delivering the data streams to the processing core chip. In some embodiments, the processing core chip then operates to complete remaining audio/video data processing, such as picture-in-picture mixing.

In a third usage case, partial audio/video computation may be performed by the audio/video sub-processing engine inside the I/O control chip. Delivering and processing high-definition audio/video streams requires not only a significant amount of bandwidth of the shared I/O channel or channels, but also requires a large amount of processing power for the processing core chip. In some embodiments, the sub-processing engine may compress the amount of data and reduce computation complexity by compressing, picture-in-picture overlaying, and enhancing audio/video data streams before transferring the data streams to the processing core chip. The described configuration may be used to offload certain computing burden of the processing core chip by utilizing the computing power of the audio/video sub-processing engine.

In an example, a television viewer may wish to watch multiple data streams, such as four HDMI input streams, in a single screen as a picture in picture display. In some embodiments, the audio/video sub-processing engine operates to merge the HDMI streams into a single data stream. In this example, the volume of data over shared I/O channel or channels may be reduced to a quarter of the original volume. Further, the processing core chip can save the computation power that would be otherwise be required for the process of merging images to generate the picture-in-picture display.

In a fourth usage case, which is similar to the previous third usage case, the output of an analog-to-digital converter is connected to an input port of an HDMI/DVI port processor. In some embodiments, this configuration may enable the audio/video sub-processing engine to receive analog interface as an input. In an example, when a television viewer wishes to watch analog input and HDMI input on a single screen as a picture-in-picture display, an audio/video sub-processing engine may combine the results of the HDMI/DVI port processor and the results of the analog-to-digital converter together to generate a picture-in-picture display. In some embodiments, in this usage case, the processing core chip may operate to save the computing power required for generating a picture-in-picture display.

Figure 4:
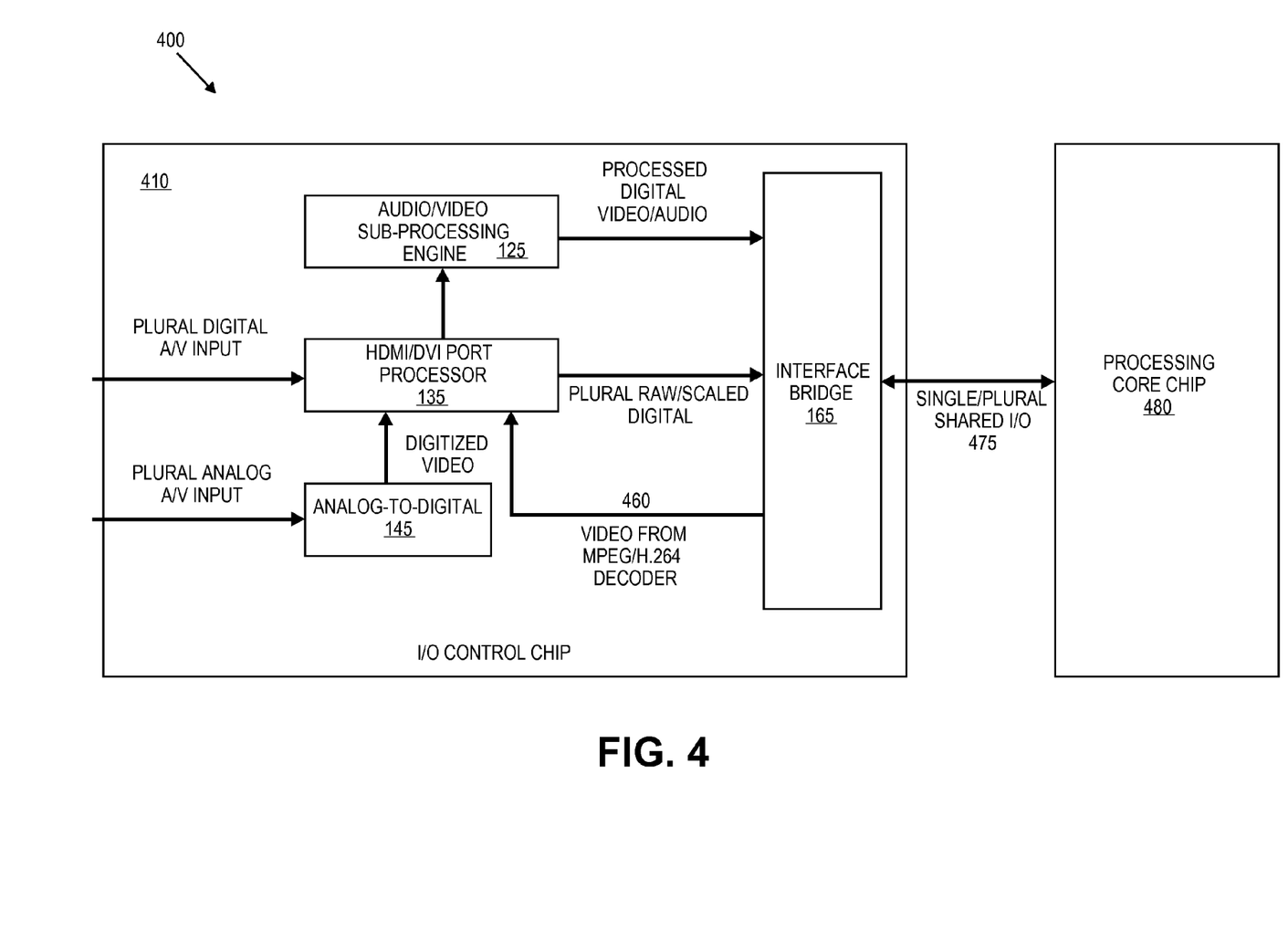
FIG. 4 illustrates an embodiment of an I/O system architecture for an advanced digital television system.

FIG. 4 illustrates an embodiment of an I/O system architecture for an advanced digital television system. The elements of the system architecture 400 are as described above with regard to FIG. 1. In this illustration, a fifth usage case may be provided in which a backward shared I/O channel 475 is used for transferring an audio/video data stream from a processing core chip 480 to an I/O control chip 410, the data stream, shown as video from MPEG (Moving Pictures Experts Group)/H.264 (also referred to as AVC—Advanced Video Coding) decoder 460, being received by the HDMI/DVI port processor 135. In some embodiments, the audio/video sub-processing engine 125 may serve as a hardware accelerator that is capable of various audio/video processing functions, such as image enhancement, picture-in-picture overlay, and image compression/decompression. After computation is completed, the resulting data stream is transferred back from the I/O control chip 410 to the processing core chip 480 to display on a video screen.

In an example, the configuration provided in FIG. 4 may be used when a television viewer wishes to, for example, watch broadcast television channels and HDMI input streams together as a picture-in-picture display. In some embodiments, a MPEG/H.264 decoder of the processing core chip (which is not illustrated) decodes the DTV (digital television) tuner signal and transfers the decoded stream to the I/O control chip 410 through the backward shared I/O channel 475. In some embodiments, the audio/video sub-processing engine 125 then takes this data stream as an input and merges it with the relevant HDMI data stream to generate a picture-in-picture display, and the generated data stream is delivered back to the processing core chip 480 over the forward shared I/O channel 475.

Figure 5:
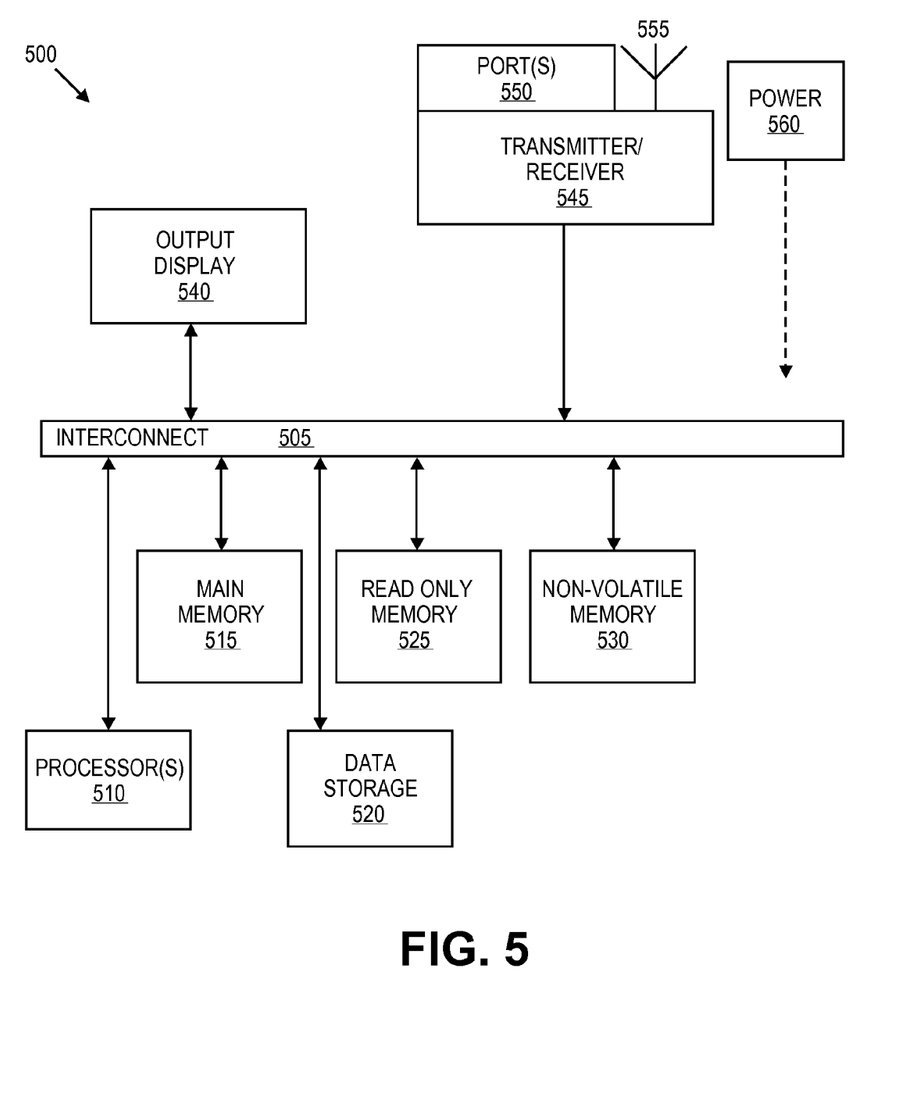
FIG. 5 illustrates an embodiment of an electronic device.

FIG. 5 illustrates an embodiment of an electronic device. In this illustration, certain standard and well-known components that are not germane to the present description are not shown. In some embodiments, the device 500 may be a device including an I/O architecture for digital television.

Under some embodiments, the device 500 comprises an interconnect or crossbar 505 or other communication means for transmission of data. The data may include various types of data, including, for example, audio-visual data and related control data. The device 500 may include a processing means such as one or more processors 510 coupled with the interconnect 505 for processing information. The processors 510 may comprise one or more physical processors and one or more logical processors. Further, each of the processors 510 may include multiple processor cores. The interconnect 505 is illustrated as a single interconnect for simplicity, but may represent multiple different interconnects or buses and the component connections to such interconnects may vary. The interconnect 505 shown in FIG. 5 is an abstraction that represents any one or more separate physical buses, point-to-point connections, or both connected by appropriate bridges, adapters, or controllers. The interconnect 505 may include, for example, a system bus, a PCI or PCIe bus, a HyperTransport or industry standard architecture (ISA) bus, a small computer system interface (SCSI) bus, a IIC (I2C) bus, or an Institute of Electrical and Electronics Engineers (IEEE) standard 1394 bus, sometimes referred to as "Firewire". ("Standard for a High Performance Serial Bus" 1394-1995, IEEE, published Aug. 30, 1996, and supplements)

In some embodiments, the device 500 further comprises a random access memory (RAM) or other dynamic storage device as a main memory 515 for storing information and instructions to be executed by the processors 510. Main memory 515 also may be used for storing data for data streams or sub-streams. RAM memory includes dynamic random access memory (DRAM), which requires refreshing of memory contents, and static random access memory (SRAM), which does not require refreshing contents, but at increased cost. DRAM memory may include synchronous dynamic random access memory (SDRAM), which includes a clock signal to control signals, and extended data-out dynamic random access memory (EDO DRAM). In some embodiments, memory of the system may certain registers or other special purpose memory. The device 500 also may comprise a read only memory (ROM) 525 or other static storage device for storing static information and instructions for the processors 510. The device 500 may include one or more non-volatile memory elements 530 for the storage of certain elements.

Data storage 520 may also be coupled to the interconnect 505 of the device 500 for storing information and instructions. The data storage 520 may include a magnetic disk or other memory device. Such elements may be combined together or may be separate components, and utilize parts of other elements of the device 500.

The device 500 may also be coupled via the interconnect 505 to an output display or presentation device 540. In some embodiments, the display 540 may include a liquid crystal display (LCD or any other display technology, for displaying information or content to an end user. In some environments, the display 540 may include a touch-screen that is also utilized as at least a part of an input device. In some environments, the display 540 may be or may include an audio device, such as a speaker for providing audio information, including the audio portion of a television program.

One or more transmitters or receivers 545 may also be coupled to the interconnect 505. In some embodiments, the device 500 may include one or more ports 550 for the reception or transmission of data. The device 500 may further include one or more antennas 555 for the reception of data via radio signals, such as a Wi-Fi network.

The device 500 may also comprise a power device or system 560, which may comprise a power supply, a battery, a solar cell, a fuel cell, or other system or device for providing or generating power. The power provided by the power device or system 560 may be distributed as required to elements of the device 500.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. There may be intermediate structure between illustrated components. The components described or illustrated herein may have additional inputs or outputs that are not illustrated or described. The illustrated elements or components may also be arranged in different arrangements or orders, including the reordering of any fields or the modification of field sizes.

The present invention may include various processes. The processes of the present invention may be performed by hardware components or may be embodied in computer-readable instructions, which may be used to cause a general purpose or special purpose processor or logic circuits programmed with the instructions to perform the processes. Alternatively, the processes may be performed by a combination of hardware and software.

Portions of the present invention may be provided as a computer program product, which may include a non-transitory computer-readable storage medium having stored thereon computer program instructions, which may be used to program a computer (or other electronic devices) to perform a process according to the present invention. The computer-readable storage medium may include, but is not limited to, floppy diskettes, optical disks, CD-ROMs (compact disk read-only memory), and magneto-optical disks, ROMs (read-only memory), RAMs (random access memory), EPROMs (erasable programmable read-only memory), EEPROMs (electrically-erasable programmable read-only memory), magnet or optical cards, flash memory, or other type of media/computer-readable medium suitable for storing electronic instructions. Moreover, the present invention may also be downloaded as a computer program product, wherein the program may be transferred from a remote computer to a requesting computer.

Many of the methods are described in their most basic form, but processes may be added to or deleted from any of the methods and information may be added or subtracted from any of the described messages without departing from the basic scope of the present invention. It will be apparent to those skilled in the art that many further modifications and adaptations may be made. The particular embodiments are not provided to limit the invention but to illustrate it.

If it is said that an element "A" is coupled to or with element "B," element A may be directly coupled to element B or be indirectly coupled through, for example, element C. When the specification states that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification refers to "a" or "an" element, this does not mean there is only one of the described elements.

An embodiment is an implementation or example of the invention. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects.

What is claimed is:

1. A multimedia system comprising:
    an I/O (input/output) control chip including a first input port to receive a first audio/video data stream from an external source, an interface bridge to receive a second audio/video data stream from a processing core chip via one or more shared I/O channels, and one or more audio/video sub-processing engines to merge the first audio/video data stream and the second audio/video data stream to generate a merged audio/video data stream, the interface bridge further to transfer the merged audio/video data stream from the one or more audio/video sub-processing engines to the processing core chip via the one or more shared I/O channels;
    the processing core chip for processing the merged audio/video data stream received from the I/O control chip to output a picture-in-picture display, and for generating the second audio/video data stream; and
    the one or more shared I/O channels for transferring the merged audio/video data stream from the I/O control chip to the processing core chip and transferring the second audio/video data stream from the processing core chip to the I/O control chip.

2. The multimedia system of claim 1, wherein the I/O control chip further includes a port processor to receive the first audio/video data stream from the external source and to receive a digital audio/video data stream from an analog to digital converter, the port processor to output a main audio/video data stream to an audio/video sub-processing engine and a raw or scaled audio/video data stream to the interface bridge, and wherein the interface bridge is further configured to output the raw or scaled audio/video data stream to the processing core chip over the one or more shared I/O channels.

3. The multimedia system of claim 2, wherein the I/O control chip further includes the analog to digital converter to convert an analog audio/video data stream into the digital audio/video data stream.

4. The multimedia system of claim 3, wherein the audio/video sub-processing engine is configured to merge the main audio/video data stream and the second audio/video data stream to generate the merged audio/video data stream.

5. The multimedia system of claim 2, wherein the port processor is an HDMI™ (High-Definition Multimedia Interface)/DVI™ (Digital Visual Interface) compatible processor.

6. An apparatus I/O (input/output) control chip operable to process two or more audio/video data streams simultaneously to a processing core chip, the I/O control chip comprising:
    a first input port to receive a first audio/video data stream from an external source;
    an interface bridge to receive a second audio/video data stream from the processing core chip via one or more shared I/O channels, the interface bridge coupled to the one or more shared I/O channels;
    I/O interface blocks including:
    a port processor to receive the first audio/video data stream and the second audio/video data stream and to output a main audio/video data stream comprising the first and second audio/video data streams and a raw or scaled digital video/audio data stream, and one or more audio/video sub-processing engines to receive the main audio/video data stream from the port processor and to merge the first and second audio/video data streams of the main audio/video data stream received from the port processor into a merged audio/video data stream, wherein the merged audio/video data stream comprises a picture-in-picture display representation of the first and second audio/video data streams;
    wherein the interface bridge is configured to receive the merged audio/video data stream from the one or more audio/video sub-processing engines and the raw or scaled digital video/audio data stream from the port processor and to transfer the merged audio/video data stream via the one or more shared I/O channels to the processing core chip for further processing, wherein the interface bridge is configured to operate in either a first mode or a second mode, wherein when operating in the first mode, the interface bridge stuffs blank areas of the merged audio/video data stream with sub-stream data from the raw or scaled audio/video data stream, and wherein when operating in the second mode, the interface bridge applies arbitration to arbitrate between the merged audio/video stream and the raw or scaled audio/video stream.

7. The apparatus I/O control chip of claim 6, wherein the I/O interface blocks further include an analog to digital converter to convert an analog audio/video data stream into a digital audio/video stream for processing by the port processor.

8. The apparatus I/O control chip of claim 6, wherein the port processor is an HDMFI™ (High-Definition Multimedia Interface)/DVI™ (Digital Visual Interface) compatible processor.

9. A method comprising:
receiving two or more audio/video data streams at a port processor of an I/O control chip, the two or more audio/video data streams including a first audio/video data stream and a second audio/video data stream;
providing the two or more audio/video data streams simultaneously to one or more audio/video sub-processing engines of the I/O control chip:
merging the two or more audio/video data streams into a merged audio/video data stream, wherein the merged audio/video data streams comprises a picture-in-picture display representation of the two or more audio/video data streams;
receiving bus transactions including the merged audio/video data stream at an interface bridge of the I/O interface chip;
while operating the interface bridge in a first mode, stuffing blank areas of the merged audio/video data stream with sub-stream data from a raw or scaled audio/video data stream outputted by the port processor to transfer the merged audio/video data stream to a processing core chip via one or more shared I/O channels between the I/O interface chip and the processing core chip; and
while operating the interface bridge in a second mode, applying arbitration to arbitrate between the merged audio/video data stream and the raw or scaled audio/video data stream to transfer the merged audio/video data stream to the processing core via the one or more shared I/O channels between the I/O interface chip and the processing core chip.

10. The method of claim 9, further comprising;
receiving an analog audio/video data stream at the I/O control chip;
converting the analog audio/video data stream into a digital audio/video data stream at an analog to digital converter; and
providing the digital audio/video data stream to the port processor, the digital audio/video data stream being one of the two or more audio/video data streams received by the port processor.

11. The multimedia system of claim 1, wherein the I/O control chip is operable to reduce certain data traffic in the transfer of the merged audio/video data stream via the one or more shared I/O channels between the I/O controller chip and the processing core chip.

12. The multimedia system of claim 11, wherein reducing the data traffic in the transfer of the merged audio/video data stream includes one or more of down-scaling, frame-rate controlling, and compressing.

13. The multimedia system of claim 1, wherein the processing core chip controls each I/O interface block of the I/O control chip.

14. The multimedia system of claim 13, wherein each of the I/O interface blocks is assigned a mutually exclusive address range, and wherein the processing core chip controls the I/O interface blocks using memory read and write operations.

15. The I/O control chip of claim 6, wherein the I/O control chip is operable to reduce certain data traffic in the transfer of the merged audio/video data stream between the I/O control chip and the processing core chip.

16. The method of claim 9, further comprising the I/O control chip reducing certain data traffic in the transfer of the merged audio/video data stream between the I/O control chip and the processing core chip.

17. The multimedia system of claim 1, wherein the interface bridge is configured to operate in either a first mode or a second mode, wherein when operating in the first mode, the interface bridge stuffs blank areas of the merged audio/video data stream with sub-stream data from a raw or scaled audio/video data stream outputted by a port processor, and wherein when operating in the second mode, the interface bridge applies arbitration to arbitrate between the merged audio/video data stream and the raw or scaled audio/video stream.

18. The multimedia system of claim 1, wherein the one or more audio/video sub-processing engines generate the picture-in-picture display.

19. The multimedia system of claim 1, wherein the processing core chip generates the picture-in-picture display.

20. The multimedia system of claim 1, wherein the I/O control chip further includes a port processor comprising:
a data decryption engine to decrypt the first digital audio/video data stream;
a multiplexer for multiplexing the first and second digital audio/video data streams to output a main audio/video data stream and a supplemental audio/video data stream;
and a downscaling or compression engine to downscale or compress the supplemental audio/video data stream to generate a raw or scaled audio/video data stream and to output the raw or scaled audio/video data stream to the interface bridge.

* * * * *